(12) United States Patent
Maas et al.

(10) Patent No.: US 11,435,474 B2
(45) Date of Patent: Sep. 6, 2022

(54) VEHICLE SYSTEM FOR DETECTION OF ONCOMING VEHICLES

(71) Applicant: VEONEER SWEDEN AB, Vargarda (SE)

(72) Inventors: Michael Maas, Munich (DE); Andreas Schmid, Dachau (DE); Christopher Unverdorben, Munich (DE)

(73) Assignee: Arriver Software AB, San Diego, CA (US)

( * ) Notice: Subject to any disclaimer, the term of this patent is extended or adjusted under 35 U.S.C. 154(b) by 330 days.

(21) Appl. No.: 16/619,785

(22) PCT Filed: Jun. 5, 2018

(86) PCT No.: PCT/EP2018/064771
§ 371 (c)(1),
(2) Date: Dec. 5, 2019

(87) PCT Pub. No.: WO2018/224500
PCT Pub. Date: Dec. 13, 2018

(65) Prior Publication Data
US 2020/0132833 A1 Apr. 30, 2020

(30) Foreign Application Priority Data

Jun. 9, 2017 (EP) .................................... 17175129

(51) Int. Cl.
*B60L 3/00* (2019.01)
*G01S 13/931* (2020.01)
(Continued)

(52) U.S. Cl.
CPC ......... *G01S 13/931* (2013.01); *B60T 8/17558* (2013.01); *B60W 30/09* (2013.01);
(Continued)

(58) Field of Classification Search
CPC ........... G01S 13/931; G01S 2013/9318; G01S 2013/93185; G01S 2013/9323;
(Continued)

(56) References Cited

U.S. PATENT DOCUMENTS 5,854,987 A * 12/1998 Sekine .................. G01C 21/28
180/443
7,885,766 B2 2/2011 Sugimoto et al.
(Continued)

FOREIGN PATENT DOCUMENTS

DE 102017210377 A1 * 12/2018 ...... B60W 60/00272

OTHER PUBLICATIONS

International Search Report and Written Opinion of PCT/EP2018/064771 dated Jul. 2, 2018.

*Primary Examiner* — Vivek D Koppikar
*Assistant Examiner* — Dominick Mulder
(74) *Attorney, Agent, or Firm* — Arriver Software AB

(57) ABSTRACT

A vehicle environment detection system (40) in an ego vehicle (1), including a sensor arrangement (4) and a main control unit (8) is arranged to detect and track at least one oncoming vehicle (9), and to determine whether the ego vehicle (1) has entered a curve (17). When this is the case. The main control unit (8) is arranged to, determine an ego direction (21) along which the ego vehicle (1) travels with a corresponding ego direction angle ($\gamma_{ego}$) with respect to a predetermined axis ($x_{glob}$), determine a measured oncoming direction (18) of the tracked oncoming vehicle (9) with a corresponding oncoming angle ($\theta_{track, glob}$) with respect to the predetermined axis ($x_{glob}$) during a plurality of radar cycles, determine a difference angle ($\delta$) between the measured oncoming direction (18) and the ego direction (21), and compare the difference angle ($\delta$) with a threshold angle ($\theta_{max}$), and to determine that the oncoming vehicle (9) is
(Continued)

crossing if the difference angle (δ) exceeds the threshold angle ($\theta_{max}$).

12 Claims, 5 Drawing Sheets

(51) Int. Cl.
  *B60T 8/1755* (2006.01)
  *B60W 30/09* (2012.01)
  *B60W 30/095* (2012.01)

(52) U.S. Cl.
  CPC .... *B60W 30/095* (2013.01); *G01S 2013/9318* (2020.01); *G01S 2013/9323* (2020.01); *G01S 2013/93185* (2020.01); *G01S 2013/93271* (2020.01)

(58) Field of Classification Search
  CPC ......... G01S 2013/93271; G01S 17/931; B60T 8/17558; B60W 30/09; B60W 30/095
  See application file for complete search history.

(56) References Cited

U.S. PATENT DOCUMENTS

| | | |
|---|---|---|
| 8,847,792 B2 | 9/2014 | Tsunekawa |
| 9,896,094 B2 | 2/2018 | Nishimura et al. |
| 2002/0091479 A1* | 7/2002 | Maruko ............... B60T 7/22 701/96 |
| 2006/0111842 A1 | 5/2006 | Sugimoto et al. |
| 2011/0175767 A1 | 7/2011 | Tsunekawa |
| 2013/0169449 A1 | 7/2013 | Tsunekawa |
| 2014/0288816 A1* | 9/2014 | Hayasaka ........... B60W 10/18 701/301 |
| 2015/0353078 A1* | 12/2015 | Kaminade ....... B60W 30/0956 701/1 |
| 2016/0207534 A1 | 7/2016 | Nishimura et al. |
| 2018/0178790 A1* | 6/2018 | Oguri ................. B60W 50/14 |
| 2018/0326979 A1* | 11/2018 | Tsuruoka ............ B60W 10/20 |
| 2018/0354506 A1* | 12/2018 | Minemura ........... G01S 13/867 |
| 2020/0198640 A1* | 6/2020 | Maas ................. B60W 40/04 |

* cited by examiner

VEHICLE SYSTEM FOR DETECTION OF ONCOMING VEHICLES

CROSS-REFERENCE TO RELATED APPLICATIONS

This application is a 35 U.S.C. § 371 national phase of PCT International Application No. PCT/EP2018/064771, filed Jun. 5, 2018, which claims the benefit of priority under 35 U.S.C. § 119 to European Patent Application No. 17175129.0, filed Jun. 9, 2017, the contents of which are incorporated herein by reference in their entirety.

FIELD OF THE INVENTION

The present disclosure relates to a vehicle environment detection system adapted to be mounted in an ego vehicle and including at least one vehicle environment sensor arrangement and a main control unit. The vehicle environment detection system is arranged to detect and track at least one oncoming vehicle.

BACKGROUND

Today, vehicle environment detection systems, such as for example camera systems, Doppler radar systems and Lidar (Light detection and ranging) systems, can be mounted on a vehicle in order to detect objects in order to implement automated vehicle systems such as speed control and collision prevention.

Radar systems are arranged to produce output including a series of reflection points as measured by radar sensors. These reflection points can be treated as separate detections or grouped as tracked objects, providing a common motion state for an extended object.

There are previously known vehicle occupant safety systems which detect side-impacts before the actual crash. In the case that it has been determined that a crash is imminent, vehicle occupants can for example be pushed towards the middle of the car.

To avoid false positives, a sensor used for this purpose has to robustly classify tracks as oncoming or crossing traffic, especially in curves.

U.S. Pat. No. 8,847,792 discloses estimating the risk of an impact of an oncoming vehicle based on the movement amount of a radar reflection point on the oncoming vehicle when the reflection point varies in a vehicle width direction from the left front end toward the right front end of an oncoming vehicle. The acquired data is used for determination of the possibility of collision with an oncoming vehicle, on a curved road or the like.

It is, however, desired to provide a vehicle radar system that is adapted to classify tracks as oncoming or crossing traffic, especially in curves in an accurate, efficient and reliable manner, which also is an object of the present disclosure. In the case of oncoming traffic, it is determined whether an oncoming vehicle will collide with an ego vehicle.

The above-described object is addressed by a vehicle environment detection system in accordance with embodiments of the present invention adapted to be mounted in an ego vehicle and including at least one vehicle environment sensor arrangement and a main control unit. The vehicle environment detection system is arranged to detect and track at least one oncoming vehicle, and to determine whether the ego vehicle has entered a curve. When the vehicle environment detection system has determined that the ego vehicle has entered a curve, for each tracked oncoming vehicle, the main control unit is arranged to:

Determine an ego direction along which the ego vehicle travels with a corresponding ego direction angle with respect to a predetermined axis.

Determine a measured oncoming direction of the tracked oncoming vehicle with a corresponding oncoming angle with respect to the predetermined axis during a plurality of measurement cycles (in a preferred embodiment—radar cycles).

Determine a difference angle between the measured oncoming direction and the ego direction.

Compare the difference angle with a threshold angle.

Determine that the oncoming vehicle is crossing if the difference angle has been determined to exceed the threshold angle.

The above-expressed object is also achieved by a method for detecting oncoming vehicles relative an ego vehicle. The method includes the step of:

Detecting and tracking at least one oncoming vehicle and determining whether the ego vehicle has entered a curve.

When it has been determined that the ego vehicle has entered a curve, for each tracked oncoming vehicle, the method further includes determining an ego direction along which the ego vehicle travels with a corresponding ego direction angle with respect to a predetermined axis and determining a measured oncoming direction of the tracked oncoming vehicle with a corresponding oncoming angle with respect to the predetermined axis during a plurality of radar cycles.

The method then includes determining a difference angle between the measured oncoming direction and the ego direction, comparing the difference angle with a threshold angle, and determining that the oncoming vehicle is crossing if the difference angle has been determined to exceed the threshold angle.

A number of advantages are obtained by the present disclosure. Mainly, a vehicle radar system is provided that determines whether an oncoming vehicle will collide with an ego vehicle in an accurate, efficient and reliable manner.

According to some aspects of embodiments of the present invention, for each tracked oncoming vehicle that has been determined to be crossing, one or more safety measures is/are applied.

According to some aspects of embodiments of the present invention, for each radar cycle, the main control unit is arranged to determine the measured oncoming direction as a straight line based on two positions, which positions define a first position at which the oncoming vehicle has a greatest distance to the ego vehicle along the predetermined axis, and a second position at which the oncoming vehicle has a smallest distance to the ego vehicle along the predetermined axis. The main control unit is then arranged to determine the oncome angle as an angle of the straight line between the two positions.

According to some aspects of embodiments of the present invention, when the vehicle environment detection system has determined that the ego vehicle has entered a curve, the main control unit is arranged to increase the threshold angle stepwise from a first threshold angle to a second threshold angle. This is performed in a in a step-wise manner according to:

$$\theta_{max}(i) = \theta_{max}(i-1) + \left(\frac{2 \cdot t_{cyc}}{\dot{\gamma}_{ego}}\right),$$

where $t_{cyc}$ is the time for each radar cycle, i is an increasing step index indicating that the current value always is calculated based on the value of the last cycle, and $\dot{\gamma}_{ego}$ is an angular rotational velocity for the ego vehicle. The second threshold angle exceeds the first threshold angle.

In this manner, the reliability of the vehicle environment detection system is increased.

According to some aspects, when the vehicle environment detection system has determined that the ego vehicle has left the curve, the threshold angle is step-wise reduced to the first threshold angle.

Other aspects of the present disclosure are disclosed in the dependent claims.

BRIEF DESCRIPTION OF THE DRAWINGS

The present disclosure will now be described more in detail with reference to the appended drawings, where.

DETAILED DESCRIPTION

Figure 1:
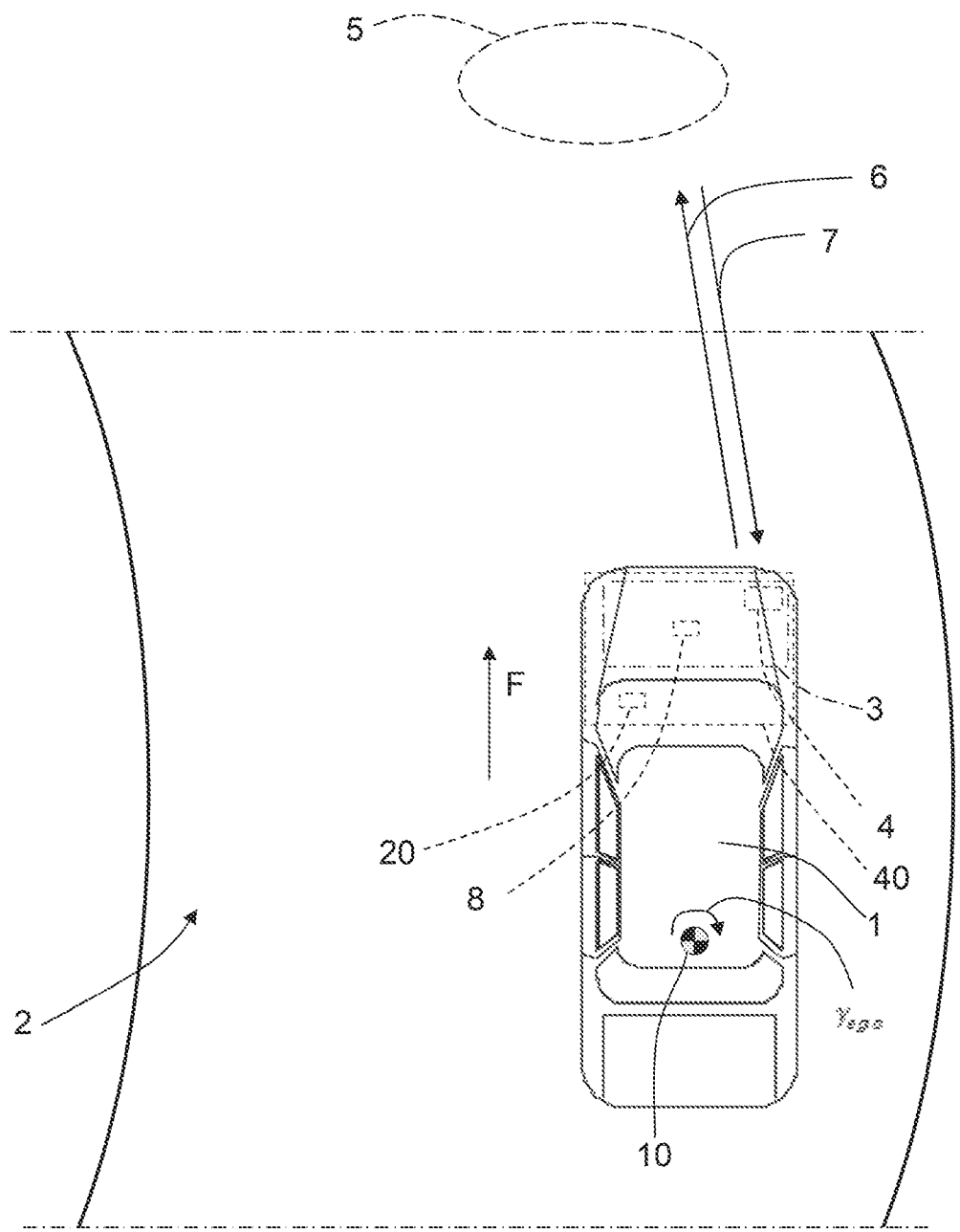
FIG. 1 shows a schematic top view of an ego vehicle.

FIG. 1 schematically shows a top view of an ego vehicle 1 arranged to run at an ego vehicle velocity v on a road 2 in a forward over-ground movement direction F, in the following referred to as ego direction F, where the ego vehicle 1 includes a vehicle radar system 3. The vehicle radar system 3 includes a radar sensor arrangement 4 that is arranged to distinguish and/or resolve single targets from the surroundings by transmitting signals 6 and receiving reflected signals 7 and using a Doppler effect in a previously well-known manner. The vehicle radar system 3 further includes a main control unit 8 that is connected to the radar sensor arrangement 4 and is arranged to provide radial velocity and azimuth angles of possible target objects 5 by simultaneously sampling and analyzing phase and amplitude of the received signals 7.

The reflected signals 7 correspond to radar detections, where the main control unit 8 includes a tracking function that is arranged to group these radar detections as tracked objects, providing a common motion state for an extended detected object.

The ego vehicle 1 has a center of mass 10 and an angular rotational velocity $\dot{\gamma}_{ego}$ around the center of mass 10, and the radar sensor arrangements 4 has a certain relation to the center of mass 10. In order to detect an ego direction angle $\gamma_{ego}$, that corresponds to the ego direction F, and the corresponding rotational velocity $\dot{\gamma}_{ego}$, a yaw sensor device 20 is connected to the main control unit 8.

Figure 2:
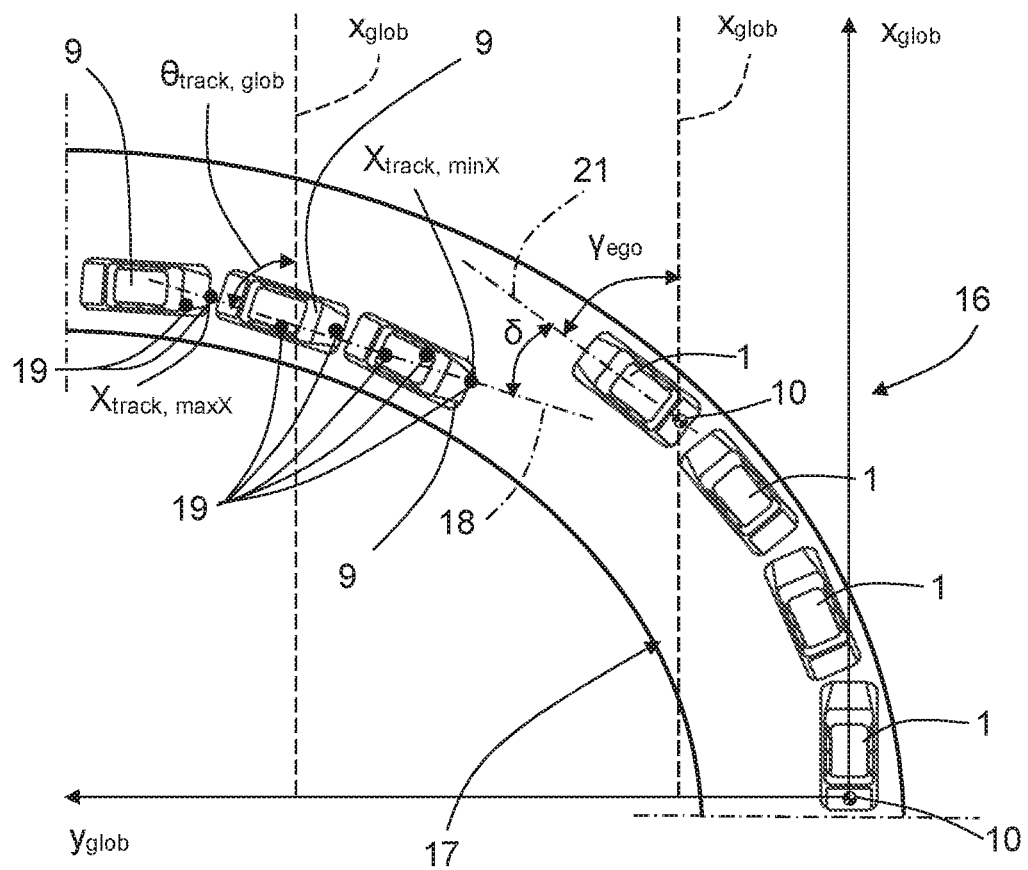
FIG. 2 shows a schematic top view of an ego vehicle and an oncoming vehicle.

With reference also to FIG. 2, the ego vehicle 1 runs in the ego direction F on the road 2, and the vehicle radar system 3 detects an object in the form of an oncoming vehicle 9. The ego vehicle's radar system 3 tracks the detected object in the form of the oncoming vehicle 9, here illustrated by means of a plurality of detections 19. The vehicles 1, 9 are shown at a plurality of positions as they approach each other.

A global coordinate system 16 having a global x-axis $x_{glob}$ and a global y-axis $y_{glob}$ is created at the point at which a curve 17 begins. Then, the ego vehicle position and the oncoming vehicle position are both calculated and observed in the global coordinate system 16. Once the ego vehicle 1 is determined to travel straight again, having departed from the curve 17, the global coordinate system 16 is deleted and for a next curve, a new global coordinate-system will be created. This will be described more in detail below.

For the tracked oncoming vehicle 9, the main control unit 8 comprised in the vehicle radar system 3 is arranged to create a global coordinate system 16 at the current position when the ego vehicle 1 is determined to have entered a curve. This is according to some aspects determined in the same way as in the previous examples.

Figure 3:
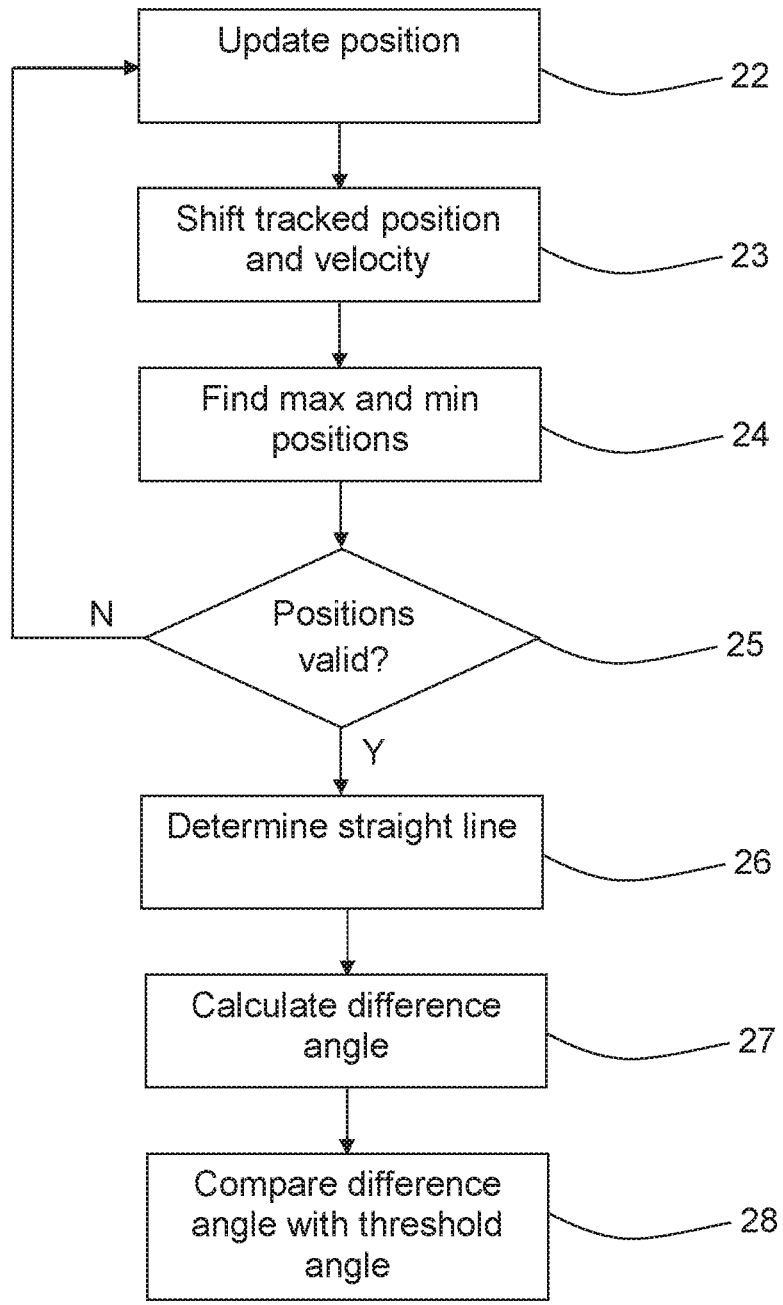
FIG. 3 shows a flowchart for a procedure according to the present disclosure.

With reference also to FIG. 3, showing a flowchart of the procedure described below, the main control unit 8 is then arranged to repeatedly perform the following steps for a plurality of radar cycles:

Step 22: Update vehicle and sensor position according to:

$$\vec{x}(i) = \vec{x}(i-1) + \left(\frac{\dot{\vec{x}}(i) + \dot{\vec{x}}(i-1)}{2}\right) \cdot t_{cyc}, \quad (1)$$

where $\vec{x}$ is a state-vector consisting of x-position and y-position, and i is an increasing step index indicating that the current value always is calculated based on the value of the last cycle.

Step 23: Shift track position and track velocity to the global coordinate system 16 according to:

$$\begin{bmatrix} \vec{x} \\ \dot{\vec{x}} \end{bmatrix}_{track} \bigg|_{sensor} \rightarrow \begin{bmatrix} \vec{X} \\ \dot{\vec{X}} \end{bmatrix}_{track} \bigg|_{global}. \quad (2)$$

Step 24: Find maximum and minimum positions $X_{track,maxX}$, $X_{track,minX}$ of tracked detections in the global x-direction.

Step 25: Determine whether new valid positions $X_{track,maxX}$, $X_{track,minX}$ have been found. This is needed since there is a minimum distance between the positions $X_{track,maxX}$, $X_{track,minX}$. If there are no valid positions, the procedure is repeated from step 22. When valid positions $X_{track,maxX}$ $X_{track,minX}$ have been found once, the procedure always continues to the following step 26 for every following radar cycle.

Step 26: When new valid positions $X_{track,maxX}$, $X_{track,minX}$ have been found, determine a straight line 18 that fits between the positions $X_{track,maxX}$, $X_{track,minX}$, and determine a global oncome angle $\theta_{track, glob}$ of the tracked object 9 between the straight line 18 and the global x-axis $x_{glob}$.

Step 27: Calculate a global oncome difference angle δ as a difference between the global oncome angle $\theta_{track}$, glob and the ego direction angle $\gamma_{ego}$ between a determined ego direction 21 and the global x-axis $x_{glob}$.

Step 28: Compare the global oncome difference angle δ with a threshold angle $\theta_{max}$.

For each radar cycle, the straight line 18 indicating the heading of the tracked object is always calculated based on two positions $X_{track,maxX}$, $X_{track,minX}$. These positions comprise a first position $X_{track,maxX}$ at which the tracked object 9 has the greatest distance to the ego vehicle 1 in the x-direction, and a second position $X_{track,minX}$ at which the tracked object has the smallest distance to the ego vehicle 1 in the x-direction.

For each radar cycle, the global oncome angle $\theta_{track, glob}$ is then determined as the angle of the straight line 18 between the two positions $X_{track,maxX}$, $X_{track,minX}$.

In order to determine whether the oncoming vehicle 9 should be determined to be crossing or not, it is determined whether the difference angle δ exceeds the threshold angle $\theta_{max}$ or not. If the oncoming vehicle 9 is determined to be crossing, suitable safety measures are taken; for example emergency braking, emergency steering and pushing vehicle occupants towards the middle of the ego vehicle 1, suitably by provision of one or more airbags.

The difference angle δ will change while driving on the curve 17; in the beginning of the curve 17 the oncoming vehicle 9 will therefore seem to be a crossing vehicle and only while the two vehicles 1, 9 move along the curve, the difference angle δ will decrease.

The safety measures are triggered shortly before an impact has been determined to occur. This means that there is enough time to classify the oncoming vehicle 9 as oncoming, and not crossing, when it comes to the final decision, even though at the beginning of the curve it was perhaps misclassified.

According to some aspects, the threshold angle $\theta_{max}$ is adaptive, such that in straight driving situations, a first threshold angle $\theta_{max1}$ is used, and in curves a second threshold angle $\theta_{max2}$ is used, where the second threshold angle $\theta_{max2}$ exceeds the first threshold angle $\theta_{max1}$. According to some aspects, the first threshold angle $\theta_{max1}$ is about 35°, and the second threshold angle $\theta_{max2}$ is about 45°.

For this purpose the main control unit 8 is arranged to determine whether the ego vehicle 1 travels in a curve or not by detecting if the angular rotational velocity $\dot{\gamma}_{ego}$ exceeds a certain threshold $\dot{\gamma}_{egomax}$, according to some aspects 2 deg/s, as mentioned previously. According to some aspects, If $\dot{\gamma}_{ego} \geq \dot{\gamma}_{egomax}$, the main control unit 8 is arranged to increase the threshold angle $\theta_{max}$ stepwise from the first threshold angle $\theta_{max1}$ to the second threshold angle $\theta_{max2}$ in a stepwise manner according to:

$$\theta_{max}(i) = \theta_{max}(i-1) + \left(\frac{2 \cdot t_{cyc}}{\dot{\gamma}_{ego}}\right), \quad (3)$$

where $t_{cyc}$ is the time for each radar cycle, and where i here as well is an increasing step index indicating that the current value always is calculated based on the value of the last cycle.

When the main control unit 8 determines that $\dot{\gamma}_{ego} < \dot{\gamma}_{egomax}$, the threshold angle $\theta_{max}$ is step-wise reduced to the first threshold angle $\theta_{max1}$.

Each subsequent step-wise change is according to some aspects performed for each subsequent radar cycle.

In this context, a radar cycle is one observation phase during which the vehicle radar system 3 is arranged to acquire data, process the data on several signal processing levels and to send out available results. This can be a fixed time interval, or it can be a dynamic time interval depending on environment conditions and processing load.

The main control unit 8 is arranged to perform the above for one or more tracked objects.

Figure 4:
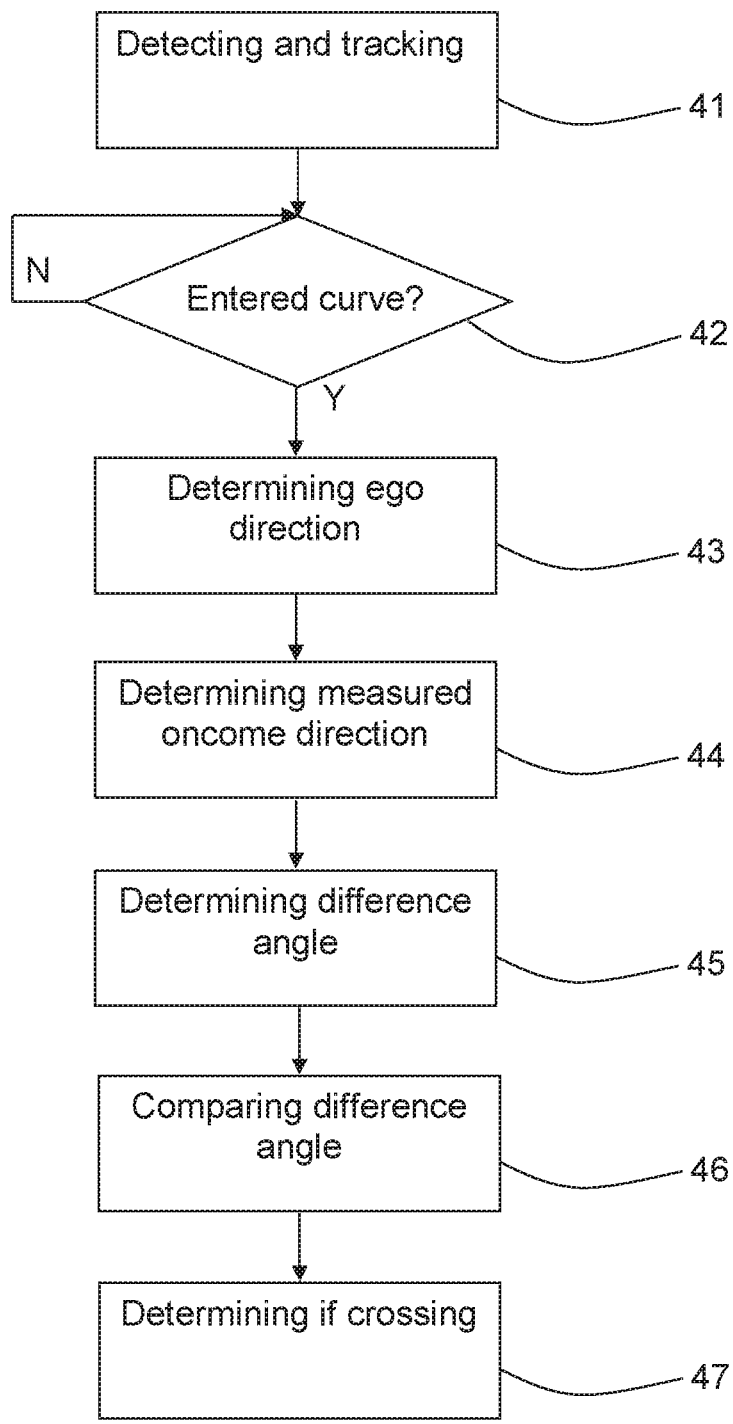
FIG. 4 shows a flowchart for a method according to the present disclosure.

With reference to FIG. 4, the present disclosure also relates to a method for detecting oncoming vehicles relative an ego vehicle 1. The method includes the steps of:

Step 41: Detecting and tracking at least one oncoming vehicle 9; and

Step 42: determining whether the ego vehicle (1) has entered a curve 17.

When it has been determined that the ego vehicle 1 has entered a curve 17, for each tracked oncoming vehicle 9, the method further includes:

Step 43: Determining an ego direction 21 along which the ego vehicle 1 travels with a corresponding ego direction angle $\gamma_{ego}$ with respect to a predetermined axis $x_{glob}$.

Step 44: Determining a measured oncoming direction 18 of the tracked oncoming vehicle 9 with a corresponding oncoming angle $\theta_{track, glob}$ with respect to the predetermined axis $x_{glob}$ during a plurality of radar cycles.

Step 45: Determining a difference angle δ between the measured oncoming direction 18 and the ego direction 21.

Step 46: Comparing the difference angle δ with a threshold angle $\theta_{max}$.

Step 47: Determining that the oncoming vehicle 9 is crossing if the difference angle δ has been determined to exceed the threshold angle $\theta_{max}$.

According to some aspects, for each tracked oncoming vehicle 9 that has been determined to be crossing, the method includes applying one or more safety measures.

Figure 5:
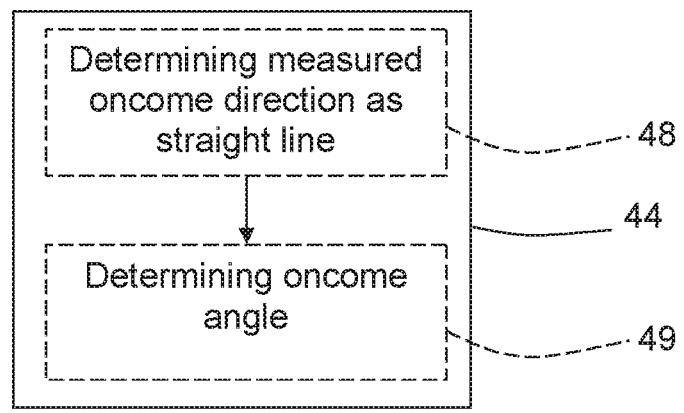
FIG. 5 shows a flowchart for a further method according to the present disclosure.

With reference to FIG. 5, regarding determining the measured oncoming direction 18, for each radar cycle, the method includes the steps of:

Step 48: Determining the measured oncoming direction 18 as a straight line 18 based on two positions $X_{track,maxX}$, $X_{track,minX}$ which positions $X_{track,maxX}$, $X_{track,minX}$ comprise a first position $X_{track,maxX}$ at which the oncoming vehicle 9 has a greatest distance to the ego vehicle 1 along the predetermined axis $x_{glob}$, and a second position $X_{track,minX}$ at which the oncoming vehicle 9 has a smallest distance to the ego vehicle 1 along the predetermined axis $x_{glob}$.

Step 49: Determining the oncome angle $\theta_{track, glob}$ as an angle of the straight line 18 between the two positions $X_{track,maxX}$, $X_{track,minX}$.

The present disclosure is not limited to the examples above, but may vary freely within the scope of the appended claims. For example, the vehicle radar system 3 is a component of a vehicle environment detection system 40. Generally, the present disclosure is related to a vehicle environment detection system 40 arranged for any suitable environment detection technology, for example radar as in the examples above, but also Lidar (Light detection and ranging) and/or image detection are conceivable. According to some aspects, when a yaw sensor device is present, the yaw sensor device 20 is provided as part of the vehicle environment detection system 40.

The vehicle environment detection system 40 generally includes one or more environment detection sensor arrangements 4.

The main control unit 8 includes one or more control unit parts which according to some aspects are combined, adjacent or distributed. One or more of such control unit parts are according to some aspects comprised in the vehicle environment detection system 40.

The orientation of the coordinates and the coordinate system may have many suitable configurations, generally there is a predetermined axis with reference to which the ego direction 21, the corresponding ego direction angle $\gamma_{ego}$, the oncoming direction 18 of the tracked oncoming vehicle 9 and the corresponding oncoming angle $\theta_{track, glob}$ are determined.

Generally, the present disclosure relates to a vehicle environment detection system 40 adapted to be mounted in an ego vehicle 1 and including at least one vehicle environment sensor arrangement 4 and a main control unit 8, where the vehicle environment detection system 40 is arranged to detect and track at least one oncoming vehicle 9, where the vehicle environment detection system 40 is arranged to determine when the ego vehicle 1 has entered a curve 17. When the vehicle environment detection system 40 has determined that the ego vehicle 1 has entered a curve 17, for each tracked oncoming vehicle 9 the main control unit 8 is arranged to:

determine an ego direction 21 along which the ego vehicle 1 travels with a corresponding ego direction angle $\gamma_{ego}$ with respect to a predetermined axis $x_{glob}$, determine a measured oncoming direction 18 of the tracked oncoming vehicle 9 with a corresponding oncoming angle $\theta_{track,\,glob}$ with respect to the predetermined axis $x_{glob}$ during a plurality of radar cycles;

determine a difference angle $\delta$ between the measured oncoming direction 18 and the ego direction 21;

compare the difference angle $\delta$ with a threshold angle $\theta_{max}$; and determine that the oncoming vehicle 9 is crossing if the difference angle $\delta$ has been determined to exceed the threshold angle $\theta_{max}$.

According to some aspects, for each tracked oncoming vehicle 9 that has been determined to be crossing, the main control unit 8 is arranged to apply one or more safety measures.

According to some aspects of embodiments of the present invention, the vehicle environment detection system 40 includes a yaw sensor device 20 that is connected to the main control unit 8 and is arranged to enable the main control unit 8 to determine an ego direction F along which the ego vehicle 1 travels and to determine whether the ego vehicle 1 has entered a curve 17.

According to some aspects of embodiments of the present invention, for each radar cycle, the main control unit 8 is arranged to:

determine the measured oncoming direction 18 as a straight line 18 based on two positions $X_{track,maxX}$, $X_{track,minX}$ which positions $X_{track,maxX}$, $X_{track,minX}$ comprise a first position $X_{track,maxX}$ at which the oncoming vehicle 9 has a greatest distance to the ego vehicle 1 along the predetermined axis $x_{glob}$, and a second position $X_{track,minX}$ at which the oncoming vehicle 9 has a smallest distance to the ego vehicle 1 along the predetermined axis $x_{glob}$; and determine the oncome angle $\theta_{track,\,glob}$ as an angle of the straight line 18 between the two positions $X_{track,maxX}$, $X_{track,minX}$.

According to some aspects of embodiments of the present invention, when the vehicle environment detection system 40 has determined that the ego vehicle 1 has entered a curve 17, the main control unit 8 is arranged to increase the threshold angle $\theta_{max}$ stepwise from a first threshold angle $\theta_{max1}$ to a second threshold angle $\theta_{max2}$ in a step-wise manner according to:

$$\theta_{max}(i) = \theta_{max}(i-1) + \left(\frac{2 \cdot t_{cyc}}{\dot{\gamma}_{ego}}\right),$$

where $t_{cyc}$ is the time for each radar cycle, i is an increasing step index indicating that the current value always is calculated based on the value of the last cycle, $\dot{\gamma}_{ego}$ is an angular rotational velocity for the ego vehicle 1, and where the second threshold angle $\theta_{max2}$ exceeds the first threshold angle $\theta_{max1}$.

According to some aspects of embodiments of the present invention, when the vehicle environment detection system 40 has determined that the ego vehicle 1 has left the curve 17, the threshold angle $\theta_{max}$ is step-wise reduced to the first threshold angle $\theta_{max1}$.

According to some aspects of embodiments of the present invention, the vehicle environment detection system 40 includes at least one of a radar system 3, a Lidar (Light detection and ranging) system and/or an image detection system.

Generally, the present disclosure also relates to a method for detecting oncoming vehicles relative an ego vehicle 1, where the method includes the steps of:

Step 41: detecting and tracking at least one oncoming vehicle 9; and

Step 42: determining whether the ego vehicle 1 has entered a curve 17.

When it has been determined that the ego vehicle 1 has entered a curve 17, for each tracked oncoming vehicle 9, the method further includes:

Step 43: determining an ego direction 21 along which the ego vehicle 1 travels with a corresponding ego direction angle $\gamma_{ego}$ with respect to a predetermined axis $x_{glob}$;

Step 44: determining a measured oncoming direction 18 of the tracked oncoming vehicle 9 with a corresponding oncoming angle $\theta_{track,\,glob}$ with respect to the predetermined axis $x_{glob}$ during a plurality of radar cycles;

Step 45: determining a difference angle $\delta$ between the measured oncoming direction 18 and the ego direction 21;

Step 46: comparing the difference angle $\delta$ with a threshold angle $\theta_{max}$; and Step 47: determining that the oncoming vehicle 9 is crossing if the difference angle $\delta$ has been determined to exceed the threshold angle $\theta_{max}$.

According to some aspects, for each tracked oncoming vehicle 9 that has been determined to be crossing, the method includes applying one or more safety measures.

According to some aspects, for each radar cycle, the method includes the steps of:

Step 48: determining the measured oncoming direction 18 as a straight line 18 based on two positions $X_{track,maxX}$, $X_{track,minX}$ which positions $X_{track,maxX}$, $X_{track,minX}$ comprise a first position $X_{track,maxX}$ at which the oncoming vehicle 9 has a greatest distance to the ego vehicle 1 along the predetermined axis $x_{glob}$, and a second position $X_{track,minX}$ at which the oncoming vehicle 9 has a smallest distance to the ego vehicle 1 along the predetermined axis $x_{glob}$; and Step 49: determining the oncome angle $\theta_{track,\,glob}$ as an angle of the straight line 18 between the two positions $X_{track,maxX}$, $X_{track,minX}$.

According to some aspects of embodiments of the present invention, when it has been determined that the ego vehicle 1 has entered a curve 17, the method includes increasing the threshold angle $\theta_{max}$ stepwise from a first threshold angle $\theta_{max1}$ to a second threshold angle $\theta_{max2}$ in a step-wise manner according to:

$$\theta_{max}(i) = \theta_{max}(i-1) + \left(\frac{2 \cdot t_{cyc}}{\dot{\gamma}_{ego}}\right),$$

where $t_{cyc}$ is the time for each radar cycle, i is an increasing step index indicating that the current value always is calculated based on the value of the last cycle, $\dot{\gamma}_{ego}$ is an angular rotational velocity for the ego vehicle 1, and where the second threshold angle $\theta_{max2}$ exceeds the first threshold angle $\theta_{max1}$.

According to some aspects of embodiments of the present invention, when it has been determined that the ego vehicle 1 has left the curve 17, the method includes step-wise reducing the threshold angle $\theta_{max}$ to the first threshold angle $\theta_{max1}$.

While the above description constitutes the preferred embodiment of the present invention, it will be appreciated that the invention is susceptible to modification, variation and change without departing from the proper scope and fair meaning of the accompanying claims.

The invention claimed is:

1. A vehicle environment detection system adapted to be mounted in an ego vehicle comprising, at least one vehicle environment sensor arrangement and a main control unit, where the vehicle environment detection system is arranged to detect and track at least one oncoming vehicle, where the vehicle environment detection system is arranged to determine when the ego vehicle has entered a curve, wherein when the vehicle environment detection system has determined that the ego vehicle has entered the curve, for the oncoming vehicle the main control unit is arranged to:
   determine an ego direction along which the ego vehicle travels with a corresponding ego direction angle with respect to a predetermined axis;
   determine a measured oncoming direction of the oncoming vehicle with a corresponding oncoming angle with respect to the predetermined axis during a plurality of measurement cycles;
   determine a difference angle between the measured oncoming direction and the ego direction;
   compare the difference angle with a threshold angle;
   determine that the oncoming vehicle is crossing if the difference angle has been determined to exceed the threshold angle; and
   adjust the threshold angle based on an angular rotational velocity of the ego vehicle.

2. The vehicle environment detection system according to claim 1 further comprising, that for the oncoming vehicle that has been determined to be crossing, the main control unit is arranged to apply one or more safety measures.

3. The vehicle environment detection system according to claim 1 wherein the vehicle environment detection system further comprises a yaw sensor device that is connected to the main control unit and is arranged to enable the main control unit to determine an ego direction along which the ego vehicle travels and to determine whether the ego vehicle has entered the curve.

4. The vehicle environment detection system according to claim 1, wherein detecting and tracking at least one oncoming vehicle includes the vehicle environment detection system receiving, during the plurality of measurement cycles, a plurality of radar detections each having a position; and further comprising, that for each radar cycle, the main control unit is arranged to:
   determine the measured oncoming direction as a straight line based on two positions, which two positions comprise a first position of the positions of the plurality of radar detections and having a greatest distance to the ego vehicle along the predetermined axis, and a second position of the positions of the plurality of radar detections and having a smallest distance to the ego vehicle along the predetermined axis; and
   determine the oncome angle as an angle of the straight line between the first and second positions.

5. The vehicle environment detection system according to claim 1 further comprising, that when the vehicle environment detection system has determined that the ego vehicle has entered the curve, the main control unit is arranged to increase the threshold angle from a first threshold angle to a second threshold angle in a step-wise manner by an amount proportional to a cycle time for each of the plurality of measurement cycles and inversely proportional to the angular rotational velocity of the ego vehicle.

6. The vehicle environment detection system according to claim 5 further comprising, that when the vehicle environment detection system has determined that the ego vehicle has left the curve, the threshold angle is step-wise reduced to the first threshold angle.

7. The vehicle environment detection system according to claim 1 wherein, the vehicle environment detection system further comprises at least one of a radar system, a Lidar system or an image detection system.

8. A method for detecting oncoming vehicles relative an ego vehicle, where the method comprises the steps of:
   detecting and tracking at least one oncoming vehicle; and
   determining whether the ego vehicle has entered a curve, and wherein when it has been determined that the ego vehicle has entered the curve, for the oncoming vehicle, the method further comprises:
   determining an ego direction along which the ego vehicle travels with a corresponding ego direction angle with respect to a predetermined axis;
   determining a measured oncoming direction of the oncoming vehicle with a corresponding oncoming angle with respect to the predetermined axis during a plurality of measurement cycles;
   determining a difference angle between the measured oncoming direction and the ego direction;
   comparing the difference angle with a threshold angle;
   determining that the oncoming vehicle is crossing if the difference angle has been determined to exceed the threshold angle; and
   adjusting the threshold angle based on an angular rotational velocity of the ego vehicle.

9. The method according to claim 8 wherein, for the oncoming vehicle that has been determined to be crossing, the method comprises applying one or more safety measures.

10. The method according to claim 8 wherein, for each measurement cycle, the method comprises:
    determining the measured oncoming direction as a straight line based on two positions, which positions comprise a first position at which the oncoming vehicle has a greatest distance to the ego vehicle along the predetermined axis, and a second position at which the oncoming vehicle has a smallest distance to the ego vehicle along the predetermined axis; and
    determining the oncome angle as an angle of the straight line between the first and second positions.

11. The method according to claim 8 wherein, that when it has been determined that the ego vehicle has entered the curve, the method further comprises, increasing the threshold angle from a first threshold angle to a second threshold angle in a step-wise manner by an amount proportional to a cycle time for each of the plurality of measurement cycles and inversely proportional to an angular rotational velocity of the ego vehicle.

12. The method according to claim 11 wherein that when it has been determined that the ego vehicle has left the curve, the method further comprises step-wise reducing the threshold angle to the first threshold angle.

* * * * *